(12) United States Patent
Tangren

(10) Patent No.: US 8,522,676 B2
(45) Date of Patent: Sep. 3, 2013

(54) GRAVITY-INDUCED IMPACT NUTCRACKER

(75) Inventor: Dwight Tangren, Plymouth, MN (US)

(73) Assignee: Impact Devices LLC, Plymouth, MN (US)

( * ) Notice: Subject to any disclaimer, the term of this patent is extended or adjusted under 35 U.S.C. 154(b) by 1100 days.

(21) Appl. No.: 12/459,310

(22) Filed: Jun. 30, 2009

(65) Prior Publication Data

US 2010/0000422 A1    Jan. 7, 2010

Related U.S. Application Data

(60) Provisional application No. 61/133,737, filed on Jul. 1, 2008.

(51) Int. Cl.
*A47J 43/00* (2006.01)

(52) U.S. Cl.
USPC ............................... 99/571; 99/577

(58) Field of Classification Search
USPC ................... 99/568–583, 600, 538–539, 584, 99/617, 618; 30/120.1, 120.2
See application file for complete search history.

(56) References Cited

U.S. PATENT DOCUMENTS

| | | | |
|---|---|---|---|
| 302,811 A | 7/1884 | Abbe | |
| 397,863 A | 2/1889 | Kuhlmann et al. | |
| 1,412,249 A | 4/1922 | McClung | |
| 2,069,877 A | 2/1937 | Fix | |
| 3,524,486 A | 8/1970 | Turner | |
| 3,667,511 A | 6/1972 | Van Der Wey | |
| 4,044,663 A * | 8/1977 | Straw | 99/577 |
| 4,378,731 A | 4/1983 | Ruangburapa | |
| 4,438,687 A | 3/1984 | McNiel | |
| 4,520,719 A | 6/1985 | Price | |
| D330,150 S | 10/1992 | Rogers | |
| 5,333,384 A | 8/1994 | Graves | |
| D358,307 S | 5/1995 | Plamann et al. | |
| 6,035,772 A * | 3/2000 | Thompson | 99/571 |
| 6,135,021 A | 10/2000 | Abrahamsson | |
| 6,237,476 B1 | 5/2001 | Beauchemin | |
| 6,247,396 B1 | 6/2001 | Rhett | |
| D452,637 S | 1/2002 | Reed et al. | |
| D461,690 S | 8/2002 | Carey | |
| D464,537 S | 10/2002 | Healy | |
| D481,272 S | 10/2003 | Jeffers | |
| 7,000,531 B2 | 2/2006 | Ross | |

* cited by examiner

*Primary Examiner* — Henry Yuen
*Assistant Examiner* — Phuong Nguyen
(74) *Attorney, Agent, or Firm* — Schroeder & Siegfried P.A.

(57) ABSTRACT

A gravity-induced impact-type nutcracker with a self-guided trip hammer that, upon actuation, drops solely via the force of gravity to strike a nut supported within a nut cracking chamber with a consistently guided uniform force. The helve of the hammer is pivotally supported adjacent its rear end between a pair of upstanding guide columns. A cord connected to the rear of the hammer helve is attached to a freewheeling take-up spool which is releasably engagable by a hand crank drive wheel to facilitate raising the hammer head to a set position prior to releasing the same. Continued rotation of the crank causes a release mechanism connected to the rear of the hammer helve to disengage the take-up spool from the drive wheel, thereby releasing and allowing the hammer to drop under its own weight. The cracking chamber which holds the nut includes a removable drawer with a variety of differently sized nut-retaining cavities formed therein for accommodating a variety of different types and sizes of nuts. The impact nutcracker is constructed primarily of wood with an aesthetically pleasing and unique appearance.

20 Claims, 6 Drawing Sheets

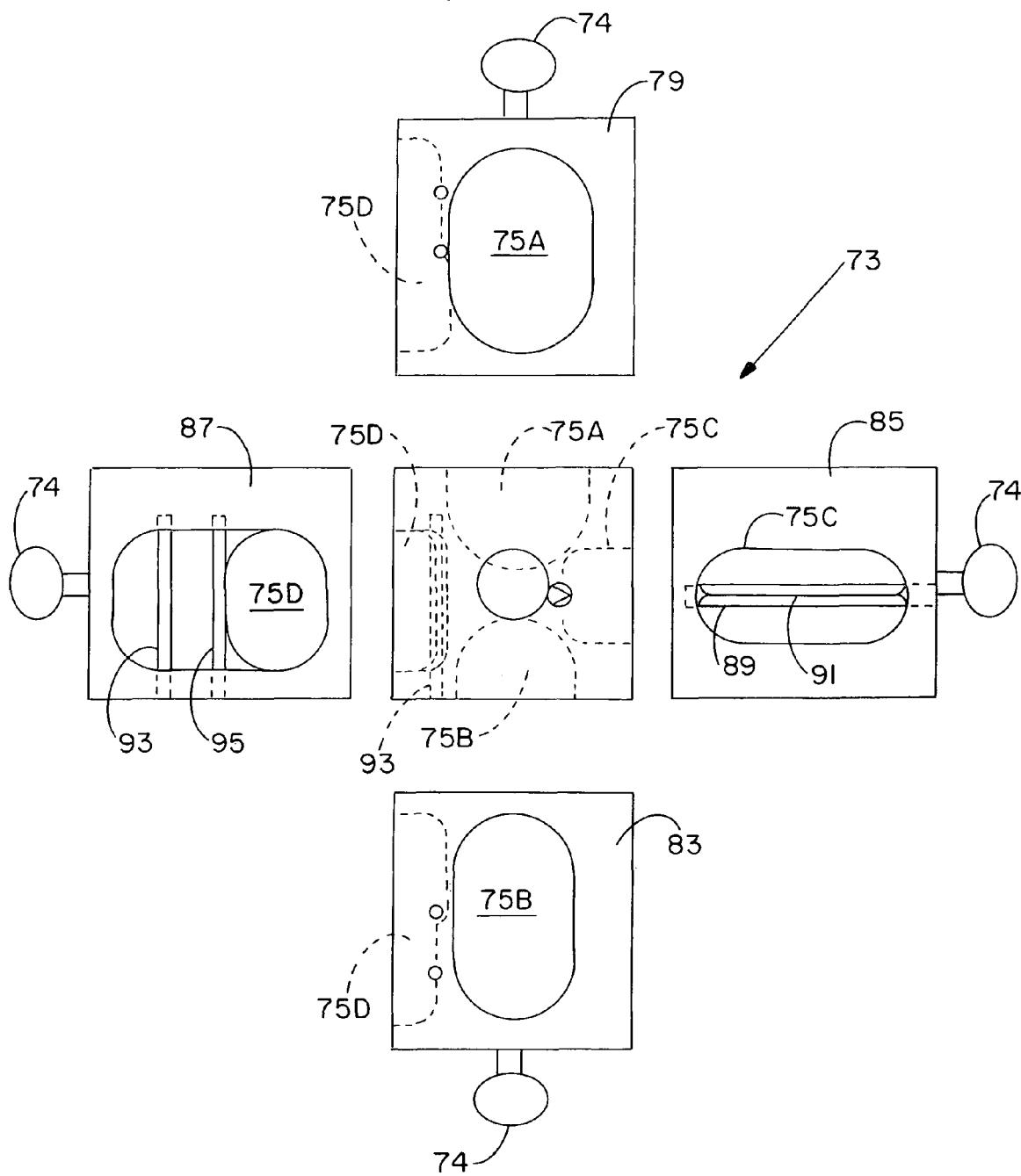

GRAVITY-INDUCED IMPACT NUTCRACKER

BACKGROUND OF THE INVENTION

The present invention relates generally to the field of nutcrackers. More particularly, the present invention relates to a hand-operated impact-type nutcracker which employs a gravity-induced impact member and an interchangeable anvil or cracking chamber capable of accommodating a variety of different types and sizes of nuts, thus facilitating cracking of the nut shells without damage to the meat of the nut.

Throughout history, many nutcrackers have heretofore been designed and implemented to satisfy the pleasure of human food consumption. Such nutcrackers have commonly been designed either for cracking nuts individually, or on a large scale commercial basis. In either case, however, the nut cracking devices generally fall within one of two categories; impact-type nutcrackers (often referred to as "inertia" nutcrackers), or leverage-type compression nutcrackers. All such nutcrackers operate on the similar principle of supporting the nut in some manner and either applying a striking or compressive force to the nut to crack the outer shell.

In most cases, impact-type nutcrackers are designed in some manner to impart a mechanically-induced impact force upon the nut to crack the shell. Such devices are generally rather complicated in structure, having multiple moving parts, spring or motor-driven impact actuators, and are unsightly to look at. Consequently, such devices are difficult to clean, may require frequent repair, and are generally stored out of sight due to their unpleasant aesthetic appeal.

Most impact nutcrackers that do not impart a mechanically-induced striking force require some manual manipulation of a hammer or impact member to strike the nut. A mere mallet or hammer has heretofore been used to crack the shell of a nut, but most known devices include some means of supporting the nut prior to striking the same. Nevertheless, manual manipulation of the striking member always involves, at least to some extent, the possibility of human error. The operator may miss the nut altogether, strike the nut only partially, or strike it too hard, thus crushing the meat of the nut. Striking the nut improperly or at a skewed angle can easily result in nut shells being scattered in all directions. While some known devices employ a guiding means for the impact member, most still require some degree of manual manipulation in determining the force with which to strike the nut, thus leading to inconsistent results.

It is therefore evident that there is a distinct need for an individual nut cracking device of the impact-type which is simplistic in design, easily hand-operated and requires minimal manual manipulation to impart a consistently guided and uniform striking force to the shell of a nut. It is further desirable that the nutcracker be capable of supporting and cracking a variety of different types and sizes of nuts, and be aesthetically pleasing to the eye so as to be capable of display in the home or workplace.

BRIEF SUMMARY OF THE INVENTION

The present invention is a gravity-induced impact-type nutcracker which utilizes a self-guided impact member or trip hammer that, upon actuation, drops solely via the force of gravity to strike a nut supported within a nut cracking anvil or chamber with a consistently guided uniform force. As used herein and throughout the appended claims, the term "gravity-induced" means the impact member is accelerated solely through the force of gravity free of mechanical assistance. The helve of the hammer is supported in pivotal relation adjacent its rear end between a pair of upstanding guide columns. These guide columns are appropriately positioned to support the hammer such that, when the flat of the hammer head meets the cracking chamber, it is in substantially coplanar relation thereto. This ensures that each nut contained within the cracking chamber is consistently struck by the hammer head in guided straight-on alignment.

The cracking chamber which holds the nut is comprised of at least one removable drawer that may include a variety of differently sized nut-retaining cavities formed therein for accommodating a variety of different types and sizes of nuts. In one embodiment, the removable drawer comprises a generally square block having a differently sized nut-retaining cavity formed on each of the four lateral sides thereof. In another embodiment, multiple drawers may be utilized, each with at least one nut-retaining cavity formed therein. Where the removable drawer is formed with multiple nut-retaining cavities, it may be readily rotated upon removal to expose the various differently sized cavities. Certain nut-retaining cavities may also include one or more cracking pins appropriately positioned to aid in cracking harder shells of various nuts. With the appropriately sized nut-retaining cavity selected and loaded, the drawer may be reinserted into the body of the cracking chamber for proper alignment of the nut under the head of the hammer.

A cord connected to the rear of the hammer helve is attached to a freewheeling take-up spool that is pivotally supported between the hammer guide columns directly below the hammer. The take-up spool is releasably engagable by a hand crank drive wheel which facilitates raising the hammer head to a set position prior to releasing the same. A spring axially biases the take-up spool toward the drive wheel such that mating drive pins carried by the spool and drive wheel engage upon rotation of the crank. By rotating the crank handle, the drive pins engage and the hammer head pivots upwardly. By continuing rotation of the crank, a release mechanism connected to the rear of the hammer helve urges the spool against its spring bias. This disengages the mating drive pins of the take-up spool and drive wheel, thereby releasing the hammer and allowing the same to drop under its own weight.

The impact nutcracker is constructed primarily of wood with an aesthetically pleasing and unique appearance. The hammer head is preferably constructed of a relatively dense wood, such as White Oak, Ash or a hard Maple. While heads of various size and shapes are possible, in the preferred embodiment, it is deemed desirable that the hammer head be designed with a weight in the approximate range of 1.85 to 2.75 pounds. It has been found that a hammer head of such construction will work acceptably well for cracking most nuts with a single strike upon pivotal movement of the hammer head through a minimum range of travel of about fifteen to twenty-five degrees away from the nut cracking chamber.

BRIEF DESCRIPTION OF THE DRAWINGS

These and other objects and advantages of the invention will more fully appear from the following description, made in connection with the accompanying drawings, wherein like reference characters refer to the same or similar parts throughout the several views, and in which:

FIG. 6 is a diagrammatical plan layout view showing an exemplary removable drawer of the nut cracking chamber incorporating various nut-retaining cavities therein.

DETAILED DESCRIPTION OF THE INVENTION

Figure 1:
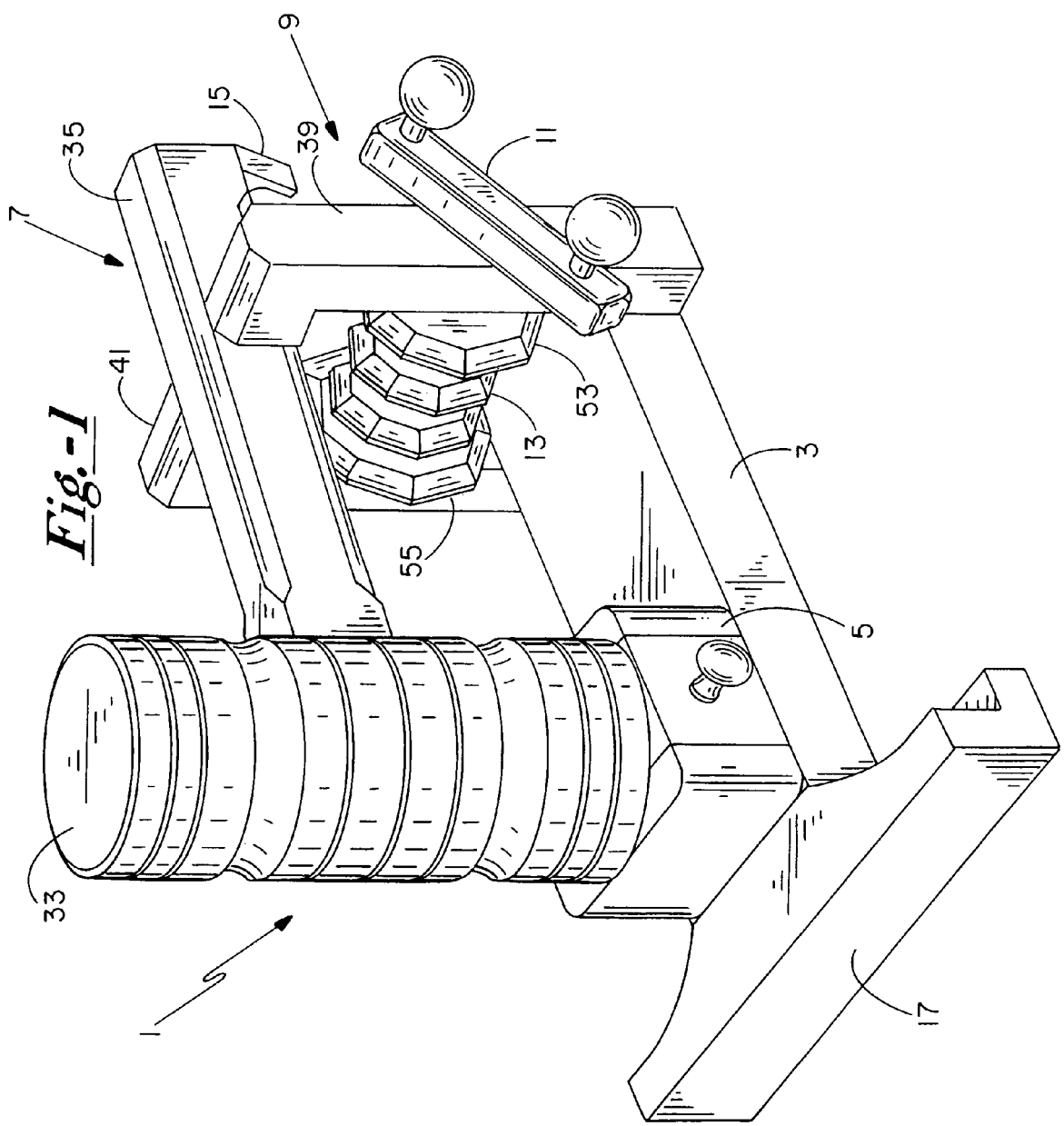
FIG. 1 is a perspective view of a gravity-induced impact nutcracker embodying the principles of the present invention, shown with the impact member in its release or impact position against the nut cracking chamber.
Figure 2:
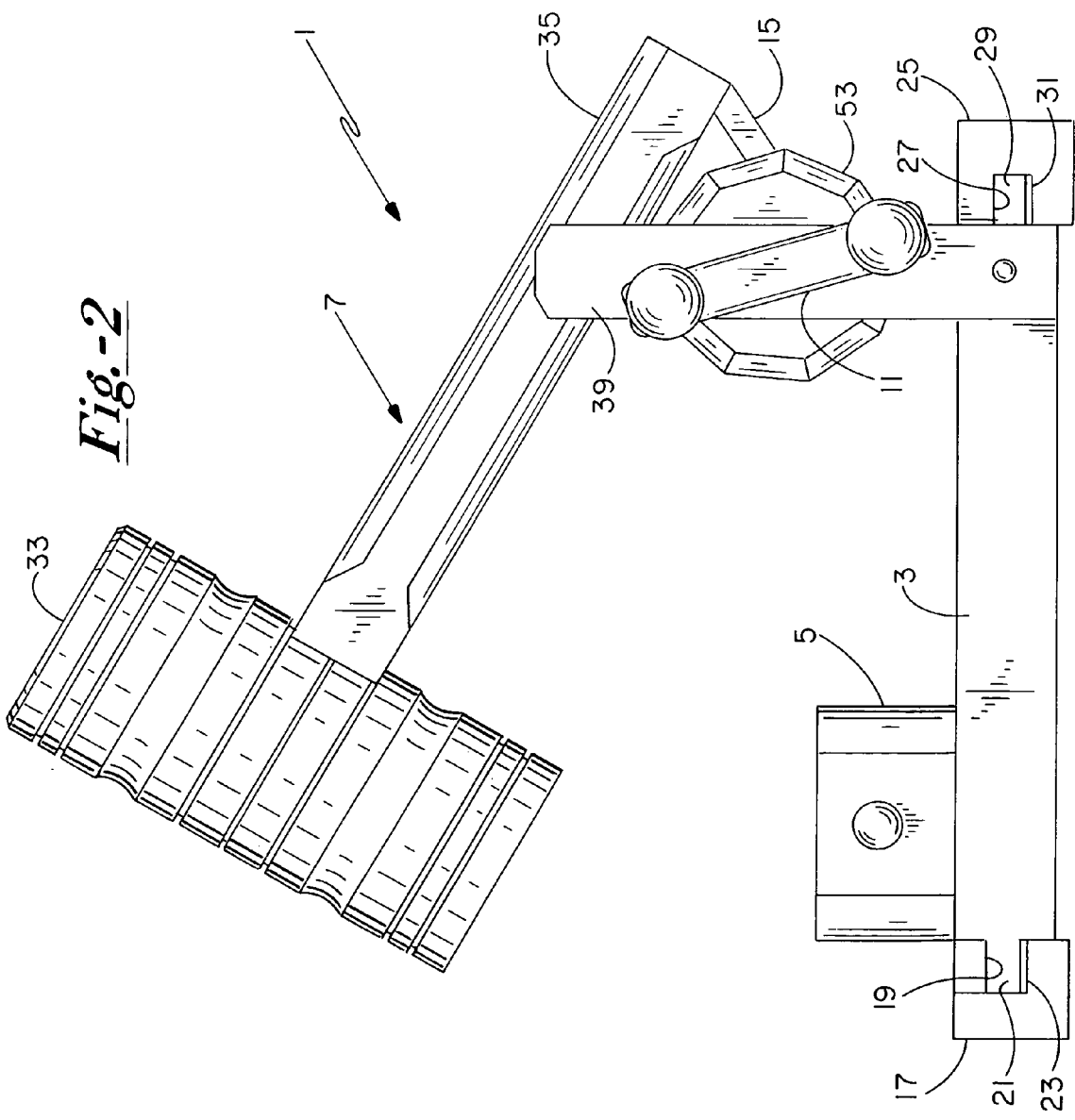
FIG. 2 is a side elevational view of the nutcracker illustrated in FIG. 1, shown with the impact member in a cocked position ready for release.

FIG. 1 of the drawings illustrates a gravity-induced impact-type nutcracker 1 embodying the principles of my invention. As shown, nutcracker 1 is generally comprised of a base 3 with a nut cracking chamber 5, and a self-guided impact member or trip hammer 7 supported in pivotal relation by the base 3 for movement between a release or impact position (FIG. 1) and an elevated release point or cocked position (FIG. 2). A drive mechanism 9 including a hand crank 11, drive wheel 53 and take-up spool 13 are utilized to raise the hammer 7 to its elevated cocked position, and a trigger release mechanism 15 carried by hammer 7 is utilized to trigger the release and drop of the hammer 7 to impact the nut cracking chamber 5.

With more particularity, as shown in FIG. 1, the nutcracker 1 includes an elongated base member 3 with a front transversely extending shock-absorbing support 17 attached thereto for stabilizing and preventing tipping of the nutcracker 1 during use. As shown in FIG. 2, the central portion of support 17 is generally C-shaped in cross section, having a central groove 19 which is designed to receive the forward tongue 21 of base 3. A peg or other attachment means (not shown) secures the support 17 to the tongue 21 of base 3 from underneath to provide a clean finished appearance to the nutcracker 1. A forward shock absorber 23 in the form of a foam pad or other resilient plastic member is sandwiched between the tongue 21 of base 3 and support 17 to help absorb the impact force of hammer 7 when it strikes the nut cracking chamber 5 upon release.

Base 3 also carries a rear shock-absorbing support member 25, which is also generally C-shaped in cross section with a central groove 27 that is adapted to receive rearward extending tongue 29 of base 3. A rear shock absorber 31 also in the form of a foam pad or other resilient plastic member is sandwiched between the tongue 29 of base 3 and support 25 to further help in absorbing the impact force of hammer 7 when it strikes the nut cracking chamber 5.

As seen in FIGS. 1 and 2, the hammer 7 has an enlarged head 33 that is attached to the hammer helve 35. As shown best in FIG. 3, the helve 35 of hammer 7 is supported in pivotal relation adjacent its rear end by an axle 37 extending between a pair of upstanding guide columns 39 and 41. In the embodiment shown, the helve 35 is secured to axle 37, the opposite ends of which are supported in freely rotatable relation within axle hub cavities 43 and 45 formed in columns 39 and 41, respectively. As seen best in FIG. 1, guide columns 39 and 41 are positioned appropriately to support the hammer 7 such that, when the flat of the hammer head 33 meets the cracking chamber 5, it is in substantially coplanar relation thereto. This ensures that each nut contained within the cracking chamber 5 is consistently struck by the hammer head 33 in guided straight-on alignment.

Figure 3:
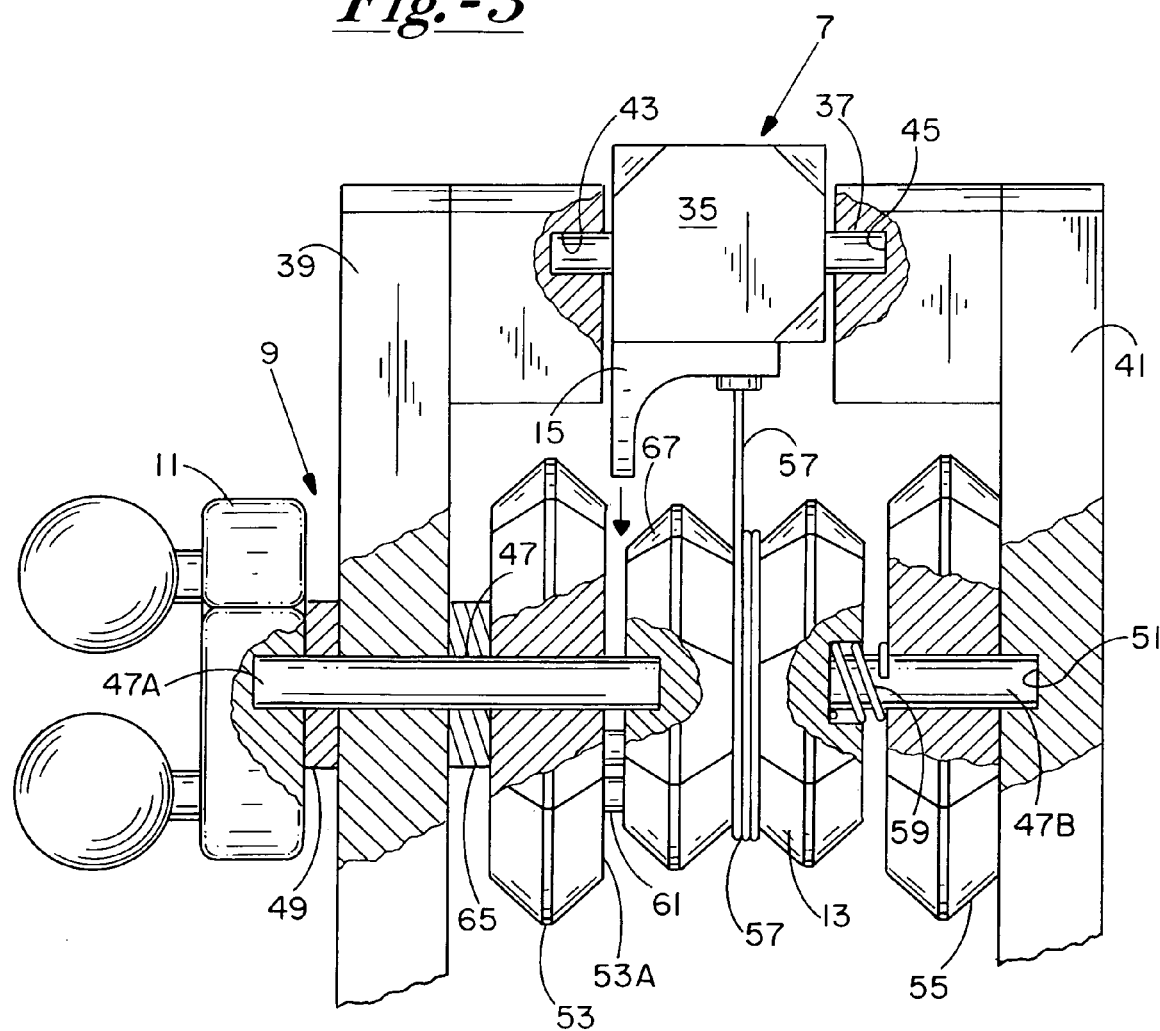
FIG. 3 is a partial rear elevational view of the nutcracker illustrated in FIG. 1, showing the drive mechanism for the impact member, with portions thereof shown broken away to illustrate the construction thereof.

The construction of the hammer drive mechanism 9 is shown best in FIG. 3. The manual crank 11 is connected to a central drive axle 47 extending between guide columns 39 and 41. The proximal end 47A of drive axle 47 extends through guide column 39 and spacer 49 to the exterior, where it is fixedly secured to crank 11. The opposite distal end 47B of drive axle 47 is carried within an axle hub cavity 51 formed in guide column 41.

Between guide columns 39 and 41, axle 47 carries a drive wheel 53, the take-up spool 13 and a spacer wheel 55. The drive wheel 53 and spacer wheel 55 are fixedly secured to axle 47 and rotate in cooperation with the rotation of crank 11. The take-up spool 13, on the other hand, is freely rotatable about drive axle 47, and is connected to the rear end of the hammer helve 35 via cord 57, which is wound around and secured to take-up spool 13.

Figure 4:
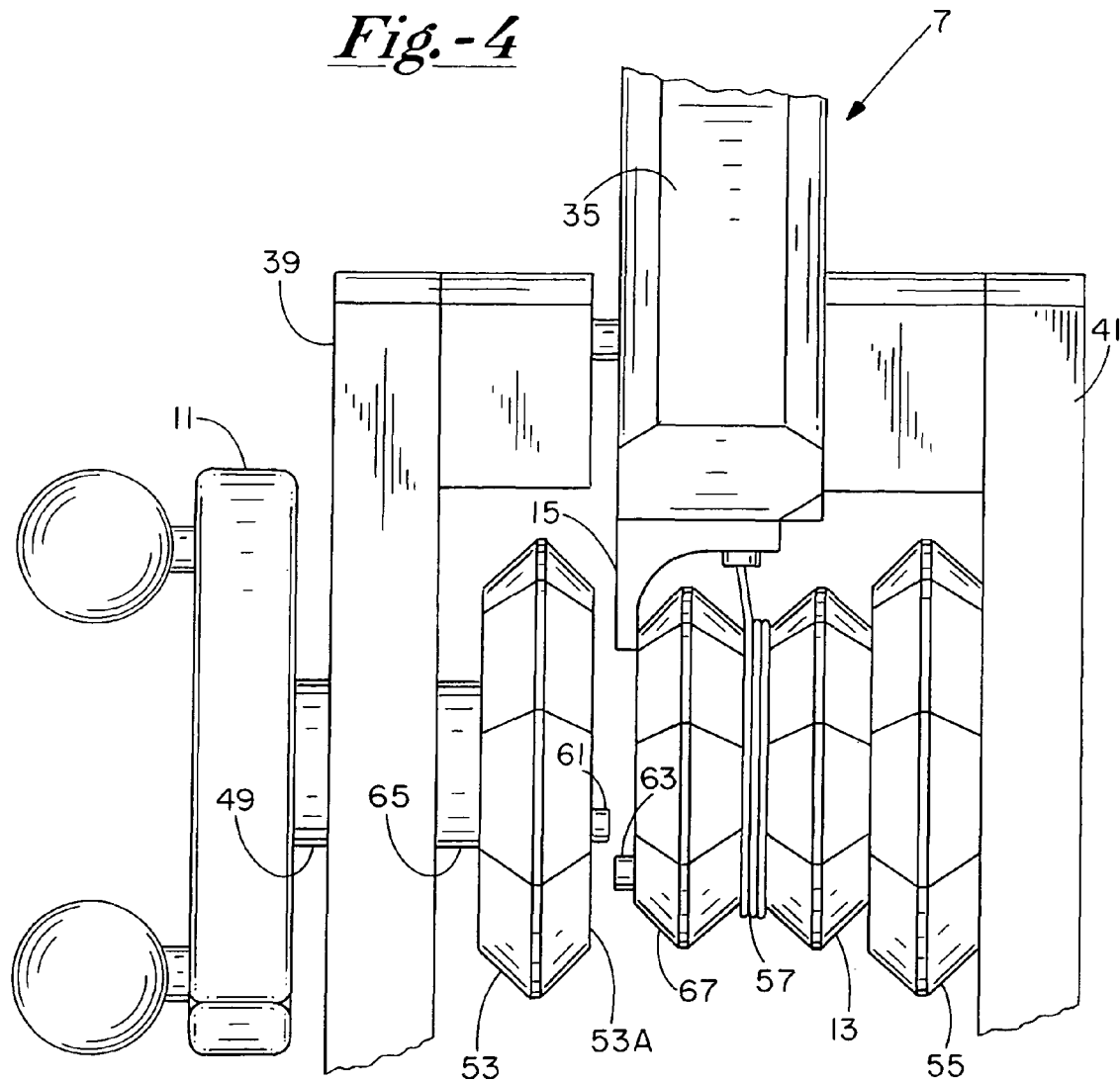
FIG. 4 is a partial rear elevational view of the nutcracker illustrated in FIG. 1, showing the trigger mechanism engaging the take-up spool for release thereof from the drive mechanism.

As shown best in FIG. 4, the drive wheel 53 includes a drive pin 61 which protrudes inward toward the take-up spool 13. Likewise, the take-up spool 13 has a mating drive pin 63 which extends outward toward the drive wheel 53 and, as shown in FIG. 3, is cooperatively positioned for engagement by drive pin 61 upon turning the crank 11. A biasing spring 59, which is carried by drive axle 47 between spacer wheel 55 and the take-up spool 13, urges the freewheeling take-up spool 13 toward the drive wheel 53, thus maintaining drive pins 61 and 63 in normally engaging alignment with one another.

As shown best in FIGS. 3 and 4, secured to the lower face of the hammer helve 35 adjacent its rear end is the trigger release mechanism 15. Notably, the drive mechanism 9 is constructed such that trigger 15 is positioned to extend downward toward the area between the drive wheel 53 and take-up spool 13. As shown in FIG. 3, spacer 65 adjacent guide column 39 ensures that the drive wheel 53 is properly positioned to facilitate alignment of trigger 15 just slightly inward of its inner face 53A. The biasing spring 59 also urges the freewheeling take-up spool 13 toward the drive wheel 53 to a position such that the outer edge of its beveled surface 67 is directly below trigger 15.

In operation, as crank 11 is manually turned clockwise, the drive wheel 53 also turns, causing drive pins 61 and 63 to engage, as shown in FIG. 3. Continued turning of crank 11 then causes the take-up spool 13 to rotate, and consequently the cord 57 to be wound therearound. As shown in FIG. 4, when the cord 57 tightens around spool 13, the hammer 7 begins to pivot about its supporting axle 37, thus causing the hammer head 33 to rise, and the rear end of the hammer helve 35 and trigger release mechanism 15 to be drawn toward the take-up spool 13.

Once the hammer head 33 is hoisted to its elevated cocked position or release point, as shown in FIG. 2, the trigger release mechanism 15 engages the beveled surface 67 of the take-up spool 13, thereby causing the spool 13 to shift away from drive wheel 53. As seen in FIG. 4, continued turning of crank 11 causes the trigger release mechanism 15 to slide between the drive wheel 53 and take-up spool 13, thereby disengaging pins 61 and 63. This releases the freewheeling take-up spool 13, and consequently the hammer 7, which drops solely via the force of gravity to strike a nut 69 (FIG. 5) supported within the nut cracking chamber 5 with a consistently guided and uniform force.

Figure 5:
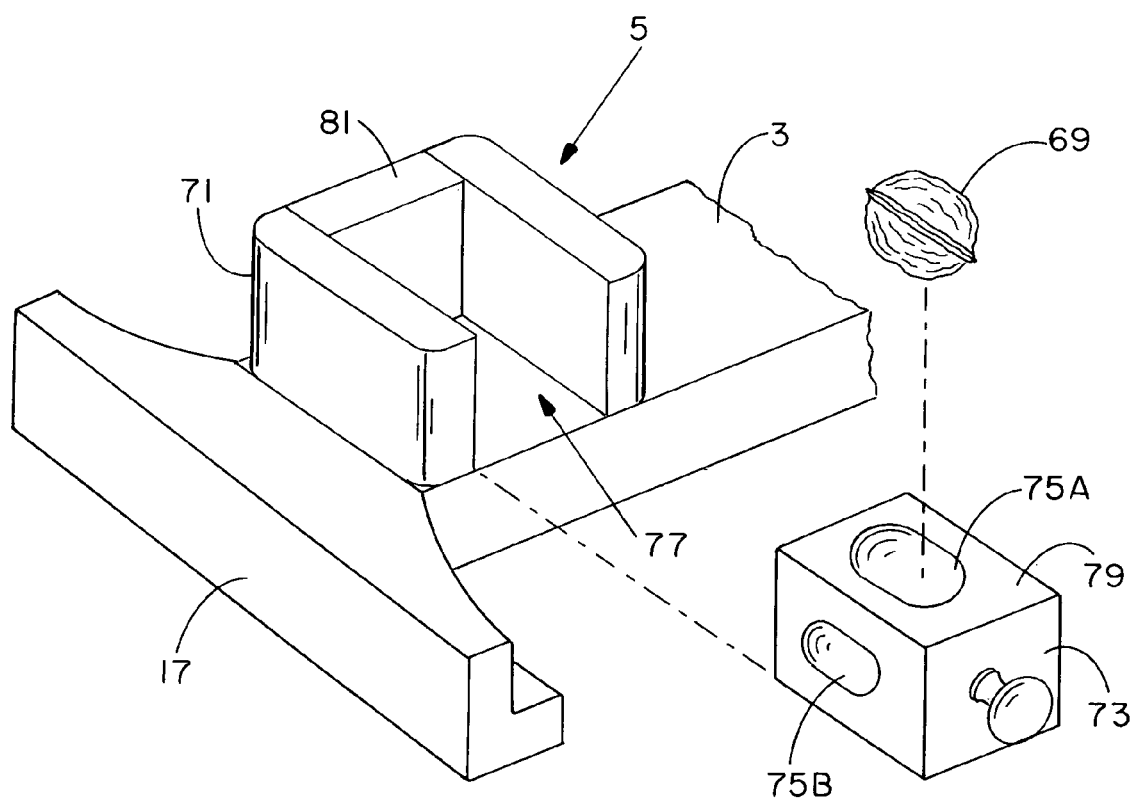
FIG. 5 is an exploded partial perspective view of the nutcracker illustrated in FIG. 1, showing one embodiment of the nut cracking chamber with a removable drawer having at least one nut-retaining cavity formed therein.

With reference to FIG. 5, it can be seen that the nut cracking chamber 5 which is adapted to hold the nut 69 is comprised of a generally U-shaped anvil 71 with at least one removable drawer 73 that may include a variety of differently sized nut-retaining cavities 75A, 75B formed therein. The nut-retaining cavities 75A, 75B are designed to accommodate and hold a variety of different types and sizes of nuts. In one embodiment, it is contemplated that the removable drawer 73 be comprised of a generally square block having a differently sized nut-retaining cavity formed on each of the four lateral sides thereof (only two shown), and a knob 74 to facilitate insertion and removal of the drawer from within chamber 5. In an alternative embodiment, multiple drawers 73 may be utilized, each with at least one nut-retaining cavity formed therein. Where the removable drawer 73 is formed with multiple nut-retaining cavities, it may be readily rotated upon removal to expose the various differently sized cavities.

As shown in FIG. 5, the drawer 71 is constructed to be freely slid within the U-shaped channel 77 of the anvil 71. The drawer 73 and anvil 71 have substantially flat coplanar upper striking surfaces 79, 81, respectively, which provide a substantially flat impact surface for the hammer head 33 upon release thereof. Each of the nut-retaining cavities 75A, 75B are designed such that an appropriate nut 69 will be held with only a small portion of the shell exposed above the flat striking surface 79, 81 of the nut cracking chamber 5. With the appropriately sized nut-retaining cavity selected and loaded, the drawer 73 may be inserted into the body 71 of the cracking chamber 5 for proper alignment of the nut 69 under the head 33 of the hammer 7.

One exemplary layout design of various sized nut-retaining cavities for a typical drawer 73 is shown in FIG. 6. As shown, the lateral sides/striking surfaces 79, 83 of drawer 73 have incorporated therein differently sized nut-retaining cavities 75A and 75B, respectively. The opposite two lateral sides/striking surfaces 85, 87 have additional alternative nut-retaining cavities 75C and 75D formed therein. As shown, nut-retaining cavity 75C includes a cracking pin 89, such pin 89 being tapered to a point along one side to form a wedge 91 which helps facilitate the cracking of nuts having harder shells, such as Brazil nuts. Optionally, the cracking pin 89 may include a handle (not shown) to facilitate rotation of the pin within cavity 75C so as to provide variable nut-cracking capability, where wedge 91 may be used to crack Brazil nuts, and pin 89 may be rotated flat within cavity 75C for cracking other nuts, such as Pecans. Nut-retaining cavity 75D is generally shallower than the other cavities and includes a pair of smaller parallel nut cracking pins 93 and 95. Pins 93 and 95 are best utilized for cracking Almonds, where the Almonds are placed with their longitudinal axes parallel with the pins, but could conceivably be helpful in cracking other nuts as well.

As illustrated, the impact nutcracker 1, which may be configured for right-hand or left-hand use, is preferably constructed primarily of wood, with an aesthetically pleasing and unique appearance. In the preferred embodiment shown, the hammer head 33 is preferably constructed of a relatively dense wood, such as White Oak, Ash or a hard Maple. While heads of various size and shapes are certainly contemplated, in the preferred embodiment, it is deemed desirable that the hammer 7 be designed such that the weight of the head 33 falls in the approximate range of 1.85 to 2.75 pounds. It has been found that a hammer head 33 of such construction will work acceptably well for cracking most nuts with a single strike upon pivotal movement of the hammer head 33 through a minimum range of travel of about fifteen to twenty-five degrees (15°-25°) away from the nut cracking chamber 5.

When configured as shown in the drawings, it has been found that a hammer head 33 of about 7½" in length and 3¼" to 4¼" in diameter is suitable for most purposes to provide the desired operational characteristics described above. For smaller diameter heads, the weight may be supplemented as necessary or desired by using a steel dowel pin (not shown) for attachment of the head 33 to the hammer helve 35. Other means as well may be utilized to alter the weight of the hammer head 33 as required or desired, without departing from the invention herein.

Other than the drive pins (61, 63), the nut cracking pins (89, 93, 95) and possibly the head dowel pin, which are preferably constructed of a suitable metal material, such as steel, and the shock absorbers 23, 31, which are preferably formed of a flexible, resilient plastic material, the impact nutcracker 1 shown in the drawings is preferably crafted entirely of wood, and is suitable for display as an aesthetically pleasing fixture in either the home or workplace. It is contemplated, however, that other materials, including but not limited to, certain plastic, metal, stone, clay and/or ceramic materials may also be utilized in constructing various components of the nutcracker without departing from the invention herein.

It will, of course, be understood that various changes may be made in the form, details, arrangement and proportions of the parts without departing from the scope of the invention which comprises the matter shown and described herein and set forth in the appended claims.

The invention claimed is:

1. A gravity-induced impact nutcracker, comprising:
   (a) a nut cracking chamber constructed to retain a nut;
   (b) a gravity-induced impact member;
   (c) a guiding device constructed to guide said impact member in pivotal movement toward and away from said nut cracking chamber;
   (d) a drive mechanism releasably engaging said impact member, said drive mechanism being constructed to impart pivotal movement of said impact member away from said nut cracking chamber through an angle of travel of not less than approximately fifteen degrees to an elevated release point above said nut cracking chamber, said drive mechanism including an elongated flexible attachment member connected to said impact member and a releasably engageable freewheeling take-up spool upon which said attachment member is wound to impart movement of said impact member away from said nut cracking chamber toward said release point; and
   (f) a trigger mechanism adapted to disengage said drive mechanism from said impact member at said release point, thereby causing said impact member to be accelerated solely through the force of gravity free of mechanical assistance and strike the nut retained by said nut cracking chamber.

2. The gravity-induced impact nutcracker defined in claim 1, wherein said impact member has an impact head constructed of a relatively dense material, the weight of which is in the approximate range of 1.85 lbs. to 2.75 lbs.

3. The gravity-induced impact nutcracker defined in claim 1, wherein said drive mechanism is constructed and arranged to impart pivotal movement of said impact member away from said nut cracking chamber through an angle of travel in the approximate range of fifteen to twenty-five degrees.

4. The gravity-induced impact nutcracker defined in claim 1, wherein said drive mechanism includes an elongated cord connected between said impact member and an unrestrained take-up spool, and a rotatable drive wheel that is adapted to releasably engage said take-up spool so as to wind said cord thereon and impart movement of said impact member away from said nut cracking chamber toward said release point.

5. The gravity-induced impact nutcracker defined in claim 4, wherein said trigger mechanism is carried by said impact member and adapted to disengage said drive wheel from said take-up spool when said impact member reaches said release point.

6. The gravity-induced impact nutcracker defined in claim 5, including a spring member which biases said take-up spool toward a normally engaging position with said drive wheel, said take-up spool being movable upon engagement by said trigger mechanism to cause disengagement of said drive wheel.

7. The gravity-induced impact nutcracker defined in claim 1, wherein said nut cracking chamber is comprised of an anvil with a removable drawer, said drawer having at least one nut-retaining cavity formed therein.

8. A gravity-induced impact nutcracker, comprising:
 (a) a nut cracking chamber constructed to retain a nut;
 (b) a gravity-induced impact member;
 (c) a guiding device constructed to guide said impact member in pivotal movement toward and away from said nut cracking chamber;
 (d) a releaseable drive mechanism for causing movement of said impact member to an elevated release point relative to said nut cracking chamber, said drive mechanism including an elongated flexible attachment member connected between said impact member and a releasably engageable freewheeling take-up spool, and a drive wheel for engaging and rotating said take-up spool to wind said attachment member therearound and impart movement of said impact member away from said nut cracking chamber toward said release point; and
 (f) a trigger mechanism adapted to disengage said drive wheel from said take-up spool at said release point, thereby causing said impact member to be accelerated solely through the force of gravity free of mechanical assistance and strike the nut retained by said nut cracking chamber.

9. The gravity-induced impact nutcracker defined in claim 8, wherein said drive mechanism is constructed to impart pivotal movement of said impact member away from said nut cracking chamber through an angle of travel of not less than approximately twenty-five degrees to said elevated release point above said nut cracking chamber.

10. The gravity-induced impact nutcracker defined in claim 8, including a spring member for biasing said take-up spool toward a normally engaging position with said drive wheel, said take-up spool being movable upon engagement by said trigger mechanism to cause disengagement of said drive wheel.

11. The gravity-induced impact nutcracker defined in claim 8, wherein said guiding device carries said take-up spool upon an axle, and said trigger mechanism is adapted to engage and slide said take-up spool along said axle to thereby disengage it from said drive wheel.

12. The gravity-induced impact nutcracker defined in claim 8, wherein said drive wheel includes a drive pin protruding toward said take-up spool and said take-up spool includes a drive pin protruding toward drive wheel, said drive wheel drive pin and said take-up spool drive pin being adapted to engage one another upon rotation of said drive wheel, thereby effecting rotation of said take-up spool and movement of said impact member.

13. The gravity-induced impact nutcracker defined in claim 8, wherein said take-up spool is freely rotatable upon a supporting axle, said take-up spool having a beveled surface against which said trigger mechanism bears when said impact member nears said release point, thereby causing said take-up spool to shift along said axle and disengage it from said drive wheel.

14. The gravity-induced impact nutcracker defined in claim 8, wherein said nut cracking chamber is comprised of an anvil with a removable drawer, said drawer having at least one nut-retaining cavity formed therein.

15. The gravity-induced impact nutcracker defined in claim 14, wherein said removable drawer is constructed with a plurality of differently sized nut-retaining cavities formed therein.

16. The gravity-induced impact nutcracker defined in claim 8, wherein said nut cracking chamber is comprised of an anvil adapted to receive at least one removable drawer with at least one nut-retaining cavity formed therein.

17. A gravity-induced impact nutcracker, comprising:
 (a) a nut cracking chamber constructed to retain a nut, said nut cracking chamber being comprised of an anvil which is adapted to receive at least one removable drawer with at least one nut-retaining cavity formed therein;
 (b) a gravity-induced impact member;
 (c) a guiding device constructed to guide said impact member in pivotal movement toward and away from said nut cracking chamber;
 (d) a releaseable drive mechanism for causing movement of said impact member to an elevated release point relative to said nut cracking chamber, said drive mechanism including an elongated flexible attachment member connected to said impact member and a releasably engageable freewheeling take-up spool upon which said attachment member is wound to impart movement of said impact member away from said nut cracking chamber toward said release point; and
 (e) a trigger mechanism adapted to disengage said drive mechanism from said impact member at said release point, thereby causing said impact member to be accelerated solely through the force of gravity free of mechanical assistance and strike the nut retained by said nut cracking chamber.

18. The gravity-induced impact nutcracker defined in claim 17, wherein said removable drawer is constructed with a plurality of differently sized nut-retaining cavities formed therein.

19. The gravity-induced impact nutcracker defined in claim 18, wherein at least one of said nut-retaining cavities includes a nut cracking pin therein.

20. The gravity-induced impact nutcracker defined in claim 19, wherein said nut cracking pin is tapered on one side thereof to form a wedge.

* * * * *